No. 676,409. Patented June 18, 1901.
P. E. BERGER.
VEHICLE.
(Application filed Jan. 9, 1901.)
(No Model.) 2 Sheets—Sheet 1.

Witnesses. Inventor.
Paul E Berger
by Philip Mauro
his attorney

THE NORRIS PETERS CO., PHOTO-LITHO., WASHINGTON, D. C.

No. 676,409. Patented June 18, 1901.
P. E. BERGER.
VEHICLE.
(Application filed Jan. 9, 1901.)

(No Model.) 2 Sheets—Sheet 2.

Witnesses. Inventor.
W. R. Edelen Paul E. Berger
by Philip Mauro
his attorney

THE NORRIS PETERS CO., PHOTO-LITHO., WASHINGTON, D. C.

UNITED STATES PATENT OFFICE.

PAUL E. BERGER, OF CHICAGO, ILLINOIS.

VEHICLE.

SPECIFICATION forming part of Letters Patent No. 676,409, dated June 18, 1901.

Application filed January 9, 1901. Serial No. 42,636. (No model.)

*To all whom it may concern:*

Be it known that I, PAUL E. BERGER, a resident of the city of Chicago, State of Illinois, have invented a new and useful Improvement in Vehicles, which invention is fully set forth in the following specification.

The objects of this invention are, first, to dispense with the metallic springs ordinarily employed in vehicles by supporting the body of the vehicle on the pneumatic or equivalent tire (with which the vehicle-wheels are equipped) approximately at points diametrically opposite the points where said tires bear on the surface of the road, and, second, to utilize this principle of construction in a self-propelled vehicle or automobile.

As it is well known that the recoil of the best-known metallic vehicle-springs when suddenly put under tension and released is much greater than that of a pneumatic cushion or tire, it will be apparent that a vehicle constructed according to my invention will ride over uneven surfaces and obstructions in the road with less jar and movement to the body of the vehicle than in the case of a vehicle equipped with the ordinary metallic springs.

The invention will be best understood by reference to the accompanying drawings, which illustrate one of the many embodiments of which it is susceptible.

Figure 1:
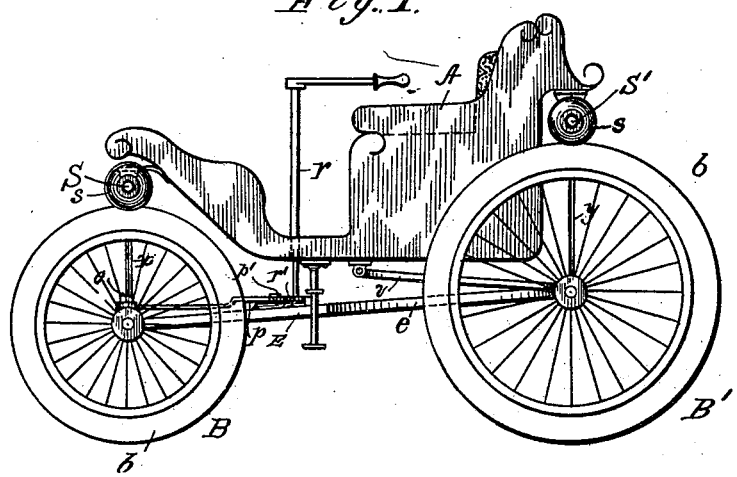
Figure 2:
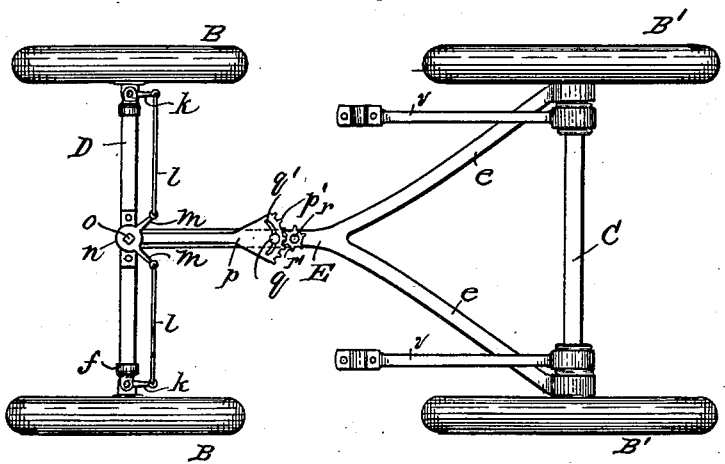
Figure 3:
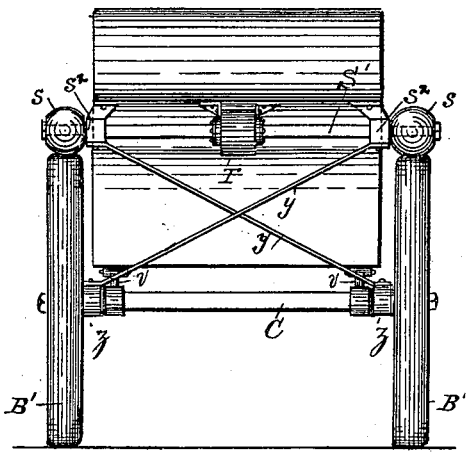
Figure 4:
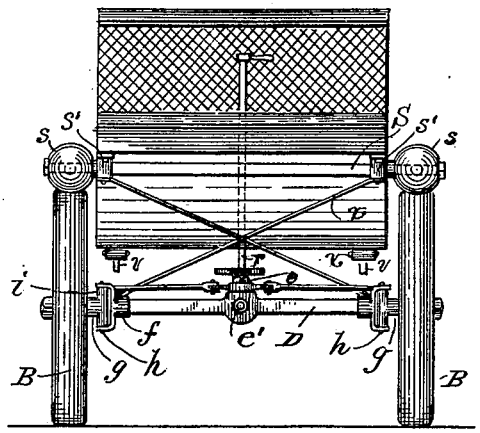

In said drawings, Figure 1 is an elevation. Fig. 2 is a plan view of the running-gear. Fig. 3 is a rear elevation, and Fig. 4 is a front elevation.

A represents the vehicle-body.

B B are the front wheels, and B' B' the rear wheels, each of said wheels being provided with the ordinary pneumatic tire $b$.

C is the rear axle, on the ends of which the wheels B' are journaled, and D is the front axle.

E is a reach which is forked at its rear end, forming arms $e$ $e$, which have bearings at their extremities engaging the rear axle C at points near the wheels B' B'. The forward end of reach E extends through a horizontal opening at the middle of the front axle D and carries nut $e'$. The front axle D being free to turn on the reach E may assume a different inclination from the rear axle as the wheels of either ride over uneven surfaces or obstructions in the roadway.

Figure 5:
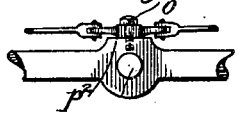

The front or steering wheels B B are mounted on the ends of the front axle in the manner common in automobiles. At each extremity the axle D carries a forked bracket $f$. Vertical sleeves $i$ on the inner ends of short extension-axles $g$ $g$ engage between the arms of the brackets $f$ $f$, respectively, and are adapted to turn on vertical pivot-pins $h$ $h$, extending therethrough and secured at their upper and lower extremities in the arms of the brackets. Short rearwardly-extending arms $k$ $k$ on the extension-axles $g$ are connected through links $l$ with the two arms $m$ $m$, respectively, on a plate $n$, which is adapted to turn on a vertical pivot-pin $o$, taking into a flat surface $p^2$ on the front axle D just above the point where the reach E passes through the same, as clearly shown in Fig. 5. An arm $p$ extends rearwardly from the plate $n$ along the top of reach E and carries at its rear extremity a toothed segment $p'$. A pin $q$ engaging a slot $q'$ in a segment $p'$ and taking into the reach acts as a guide and stop for the movement of the arm $p$. A vertically-disposed shaft $r$ extending upwardly through the bottom of body A carries at its lower end a pinion $r'$ in engagement with the teeth of segment $p'$ and at its upper extremity has a handle which may be manipulated by the operator to turn the front wheels B B, and thus steer the vehicle.

The body A carries at its front and rear ends shafts S S', respectively mounted in suitable bearings $s'$ $s'$ and $s^2$ $s^2$ and carrying at their extremities wheels $s$, preferably of spherical form, as shown. The wheels $s$ bear, respectively, upon the pneumatic tires $b$ of the road-wheels at points approximately diametrically opposite the points where said tires bear upon the surface of the roadway, so that the strain of supporting the vehicle-body falls upon the wheels in practically a vertical direction. The rear shaft S' is rotatably mounted on the body A, and the wheels $s$ are fixed thereto.

T is a motor—such, for example, as an electric motor—supplied with power stored in the body A for driving shaft S' and through the frictional contact of wheels s with the pneumatic tires b rotating wheels B B and propelling the vehicle.

In order to prevent longitudinal movement of body A with reference to the running-gear, bars v v are pivotally connected at their rear ends to rear axle C and at their forward ends to the under side of body A.

At the front of the vehicle (see Fig. 4) two flexible straps or bands x x are secured at their upper extremities to the under side of bearings $s^2 s^2$ and crossed, their lower ends being secured to brackets f f, respectively. Similarly-arranged straps y y at the rear of the vehicle, Fig. 3, are secured at their upper ends to bearings s' s' and at their lower ends to sleeves z z, respectively, fast on axle C. These two sets of straps x x and y y, while permitting the axles to move in a vertical direction and to different inclinations, prevent lateral movement of the body A with reference to the running-gear.

As will be apparent, various modifications may be made without departing from the principle of the invention.

What I claim is—

1. In a vehicle, road-wheels having resilient tires, a body or seat, and wheels mounted on said body or seat bearing on the tires of the road-wheels and entirely supporting the body.

2. In a vehicle, road-wheels having pneumatic tires, a body or seat, and wheels mounted on said body or seat bearing on the tires of the road-wheels and entirely supporting the body.

3. In a four-wheeled vehicle, four road-wheels having resilient tires, a body, four wheels mounted on said body and bearing respectively on the tires of the road-wheels whereby the body is supported.

4. In a four-wheeled vehicle, four road-wheels having resilient tires, a vehicle-body, laterally-extending shafts or auxiliary axles one on said body at each end thereof, four wheels two mounted on each shaft and bearing on the tires of the road-wheels respectively, whereby the vehicle-body is supported.

5. In a four-wheeled vehicle, a running-gear frame, four road-wheels journaled thereon, a vehicle-body, four wheels mounted on the vehicle-body and bearing on the tires of the road-wheels respectively, whereby the body is supported, and connections between the body and the running-gear frame for preventing said body from moving longitudinally or laterally with reference to said frame.

6. In a four-wheeled vehicle, a running-gear frame comprising front and rear axles and means connecting the same, two front and two rear wheels on said axles respectively, a vehicle-body, four wheels mounted on the vehicle-body and bearing on the tires of the road-wheels respectively, whereby the body is supported, two bars for preventing longitudinal movement of the body with reference to the running-gear pivoted at one end to the vehicle-body and at the other end to one of the axles, and crossed straps or bands connecting the running-gear with the body at front and rear for preventing lateral movement of the body with reference to the running-gear.

7. In a self-propelled vehicle, road-wheels having resilient tires, a body or seat, wheels mounted on said body or seat bearing on the tires of the road-wheels and entirely supporting the body, and a motor for rotating one of said wheels to impart movement to the corresponding road-wheel and thus propel the vehicle.

8. In a self-propelled vehicle, four road-wheels having resilient tires, a vehicle-body, four wheels mounted on the body and bearing the tires respectively, whereby the body is supported, a motor for driving two of said wheels to impart rotary movement to two of the road-wheels to propel the vehicle, and means whereby the operator may turn two of the road-wheels to guide the vehicle.

9. In a self-propelled four-wheeled vehicle, a running-gear comprising front and rear axles, front and rear wheels on said axles respectively and a reach connecting the front and rear axles but permitting them to assume different inclinations, a vehicle-body, two laterally-extending shafts on said body, wheels on said shafts bearing on the road-wheels respectively, whereby the body is supported, a motor for rotating the wheels which bear against the rear road-wheels thereby driving the latter to propel the vehicle, and means whereby the operator may turn the front road-wheels to guide the vehicle.

In testimony whereof I have signed this specification in the presence of two subscribing witnesses.

PAUL E. BERGER.

Witnesses:
E. C. LINDSEY,
RALPH CREWS.